US009032432B2

(12) United States Patent
Vinokurov et al.

(10) Patent No.: US 9,032,432 B2
(45) Date of Patent: May 12, 2015

(54) MANAGING UNDESIRABLE CONTENT IN IP VIDEO BROADCAST TRAFFIC

(75) Inventors: Dmitri Vinokurov, Ottawa (CA); Rob MacIntosh, Carp (CA)

(73) Assignee: Alcatel Lucent, Boulogne Billancourt (FR)

(*) Notice: Subject to any disclaimer, the term of this patent is extended or adjusted under 35 U.S.C. 154(b) by 1840 days.

(21) Appl. No.: 12/146,716

(22) Filed: Jun. 26, 2008

(65) Prior Publication Data

US 2009/0328095 A1    Dec. 31, 2009

(51) Int. Cl.
| | | |
|---|---|---|
| H04N 7/10 | (2006.01) | |
| H04N 7/025 | (2006.01) | |
| H04N 7/173 | (2011.01) | |
| H04H 20/10 | (2008.01) | |
| H04N 21/44 | (2011.01) | |
| H04N 21/61 | (2011.01) | |
| H04N 21/81 | (2011.01) | |
| H04N 21/84 | (2011.01) | |

(52) U.S. Cl.
CPC ............... *H04N 7/173* (2013.01); *H04H 20/10* (2013.01); *H04N 21/44016* (2013.01); *H04N 21/6125* (2013.01); *H04N 21/812* (2013.01); *H04N 21/84* (2013.01)

(58) Field of Classification Search
USPC .................................. 725/32, 34, 35
See application file for complete search history.

(56) References Cited

U.S. PATENT DOCUMENTS

| | | | | |
|---|---|---|---|---|
| 5,446,919 A | * | 8/1995 | Wilkins | .......................... 725/35 |
| 2002/0087975 A1 | * | 7/2002 | Schlack | .......................... 725/34 |
| 2007/0283384 A1 | * | 12/2007 | Haeuser et al. | ................. 725/34 |

* cited by examiner

*Primary Examiner* — Kunal Langhnoja
(74) *Attorney, Agent, or Firm* — Marks & Clerk; S. Mark Budd

(57) ABSTRACT

A method and apparatus are provided for suppressing display of advertisements within a video over IP stream provided by a content provider. Metadata is prepended to advertisements within the stream. When the stream is received by an access aggregation point, the access aggregation point compares the metadata of an advertisement with preset criteria provided by an enterprise subscriber, and suppresses the advertisement if a comparison of the metadata and the preset criteria indicate that the advertisement is undesirable to the enterprise subscriber. The access aggregation point suppresses the advertisement by switching to a second video channel within the stream for the duration of the advertisement. In this way, the access aggregation point can control display of content provider advertisements without manipulating data within the stream, so as to allow the enterprise subscriber to prevent display of undesirable advertisements to endpoints within the enterprise subscriber site such as set-top boxes within hotel rooms.

19 Claims, 4 Drawing Sheets

MANAGING UNDESIRABLE CONTENT IN IP VIDEO BROADCAST TRAFFIC

FIELD OF THE INVENTION

This invention relates to video over IP, and more particularly to management of advertisements in video over IP streams.

BACKGROUND OF THE INVENTION

One of the advantages of video over Internet Protocol (IP) is the ability to deliver media content which is customized specific to the end-user or to the location of the end-user, and to provide interactive user experiences for the service consumers. Insertion of customized media assets, such as advertisements, into a broadcast content stream is one of the services that broadband Access Providers (APs) can leverage to provide differentiating services over a competitive broadband network. The customized media asset content could be defined, for example, by the individual subscriber profile or by an agreement between the AP and an enterprise subscriber hosting many endpoints at the same access area, such as a hospital, hotel or hotel chain, restaurant or restaurant chain, or fitness club.

Content streams provided by content providers therefore contain reserved timeslots into which an AP can insert customized content. However these content streams also include timeslots into which the content provider inserts advertisements. These content provider embedded advertisements are typically not customized to individual or enterprise subscribers, although they may be customized to a geographic area.

Under some circumstances, an enterprise subscriber hosting multiple IP television (IPTV) endpoints may not wish for particular advertisements to be displayed to its endpoints. For example, a hotel providing video over IP streams to set-top boxes in its rooms may wish to avoid presentation of advertisements for competitor hotels. As another example, display of advertisements for alcohol products may not be desirable on TV screens at children's summer camps or at hospitals.

While the enterprise subscriber may negotiate with the AP to prevent insertion of such advertisements by the AP, the AP typically has no control over advertisements inserted by the content provider. Furthermore, the AP may be unable to alter the video stream provided by the content provider, including content provider inserted advertisements, for legal reasons. A system in which an AP was able to control display of advertisements in video streams would allow an AP to offer differentiated service to its clients, and would allow an enterprise subscriber additional control over content made available to IPTV endpoints within its control.

SUMMARY OF THE INVENTION

According to one aspect, the invention provides a method of controlling display of advertisements within a video over IP stream originating at a content provider. A first video channel within the stream is received at an access aggregation point. The first video channel is transmitted to an endpoint. Upon detection by the access aggregation point of metadata indicating an advertisement within the first video channel, the metadata is compared with preset criteria. If the comparison indicates that the advertisement is undesirable, display of the advertisement is suppressed by switching transmission to a second video channel. An access aggregation point for carrying out the method of the invention is also provided.

According to another aspect, the invention provides a method of transmitting advertisements within a video over IP stream. Metadata is associated with an advertisement. The metadata is inserted within an encoding frame of a payload of the advertisement. The payload of the advertisement is transmitted within the video over IP stream.

The methods of the invention may be stored as processing instructions on computer-readable media, the instructions being executable by a computer processor.

The invention allows an access provider operating an access aggregation point, such as a DSLAM or a business access router, to provide differentiating service to enterprise subscribers. By associating metadata with advertisements, content provider advertisements undesirable to an enterprise subscriber can be identified and their display suppressed at an access aggregation point. Since the access provider generally does not have legal authority to manipulate the content provider advertisements, the advertisements can be suppressed by simply switching the channel being transmitted to an end-user from the channel carrying the undesirable advertisement to a different content source, either to a content provider channel carrying an advertisement which does not conflict with the enterprise subscriber's local advertisement policy or to an enterprise subscriber channel. Content providers who embed metadata allowing automated recognition of advertisements may be able to charge a premium to their customers.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
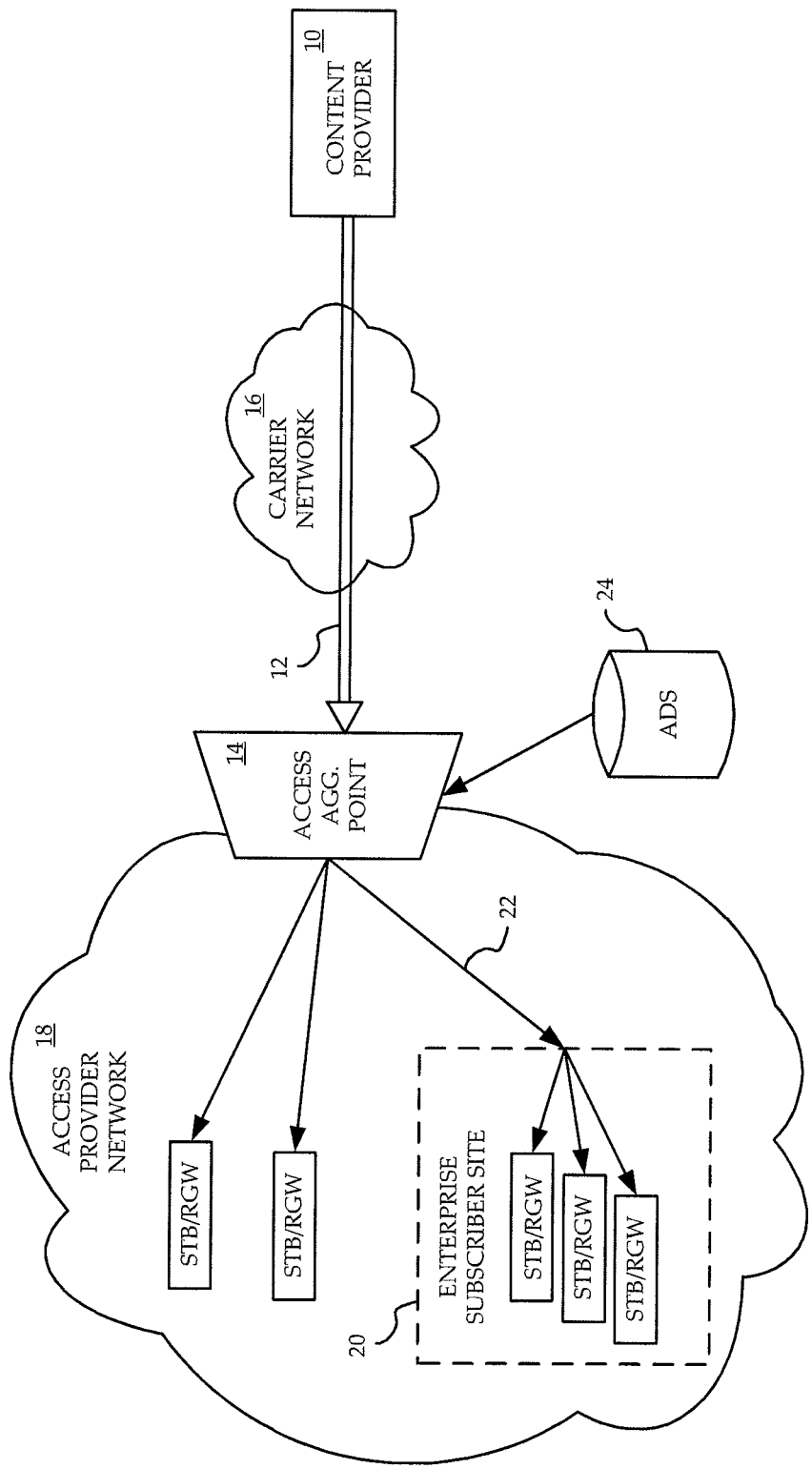
FIG. 1 is a schematic diagram of a portion of an example video over IP network.

Referring to FIG. 1, a schematic diagram of a portion of an example video over Internet Protocol (IP) network is shown. A content provider operates a server 10 which provides a broadcast stream 12 to an access aggregation point 14 over a carrier network 16. The broadcast stream 12 includes a plurality of video channels. The access aggregation point 14, which may be for example a DSLAM or an access router, transmits video channels of the broadcast stream 12 to endpoints within an access provider network 18 in multicast or unicast mode, the selection of which video channel to send to each endpoint being made by an end-user of the endpoint. The endpoints are typically set-top boxes (STBs) or residential gateways (RGWs). Some endpoints may be individual endpoints, but some endpoints are within an enterprise subscriber site 20. An example of endpoints within an enterprise subscriber site are hotel room STBs within a hotel, although the invention is not limited to such an example. The enterprise subscriber site 20 may be any organization which manages numerous STBs or RGWs, such as a hospital managing STBs within its patient rooms or a summer camp for children managing STBs throughout the camp. The access aggregation point 14 transmits video channels to the enterprise subscriber site 20 as a collection 22 of one or more video channels, the number of video channels in the collection being dependent on the number of endpoints within the enterprise subscriber site 20 which are currently viewing the video over IP. The access aggregation point 14 may have access to access provider advertisements 24, which can be inserted into the video channels by the operator of the access aggregation point (typically an access provider also exerting administrative control over the access provider network 18) as described below with reference to FIG. 2.

The network of FIG. 1 is an example only, and more generally there may be any number of enterprise subscriber sites 20 served by the access aggregation point 14. There may also be more than one content provider 10, each providing its own broadcast stream 12 to the access aggregation point 14 for distribution of video channels to endpoints within the access provider network 18.

Figure 2:
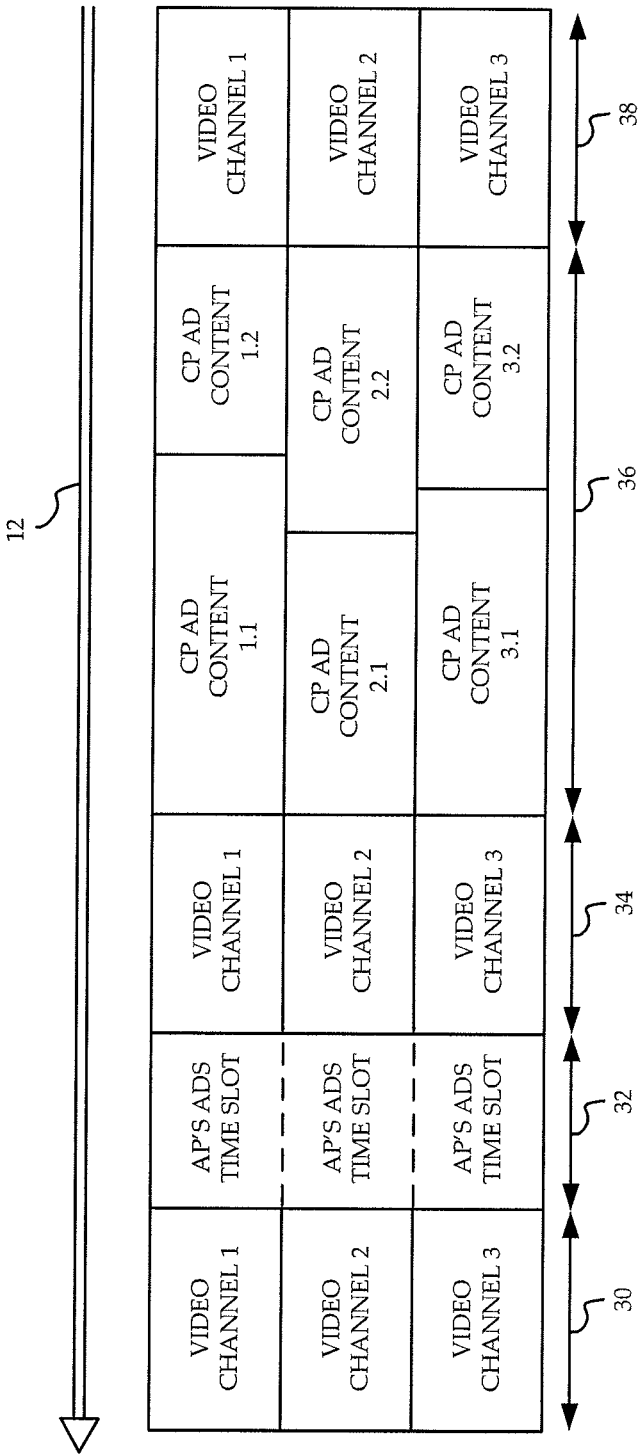
FIG. 2 is a diagram of an example broadcast stream provided by the content provider of FIG. 1.

Referring to FIG. 2, a diagram of an example broadcast stream provided by the content provider 10 is shown. In this example, the broadcast stream includes three video channels. During an initial period 30, each video channel contains video content provided by the content provider 10. During a first time slot 32, the content provider 10 leaves room for the access aggregation point 14 to insert access provider advertisements into the video channels. The time slot 32 is the same duration for all video channels. Transmission of the video content by the content provider 10 then resumes for a second period 34. During a second time slot 36, the content provider 10 inserts content provider advertisements into the video channels. Transmission of the video content by the content provider 10 then resumes for a third period 38. The various durations shown in FIG. 2 are not to scale, and the duration of each video content transmission may of course be longer than the advertisement time slots.

This model allows both the content provider and the access provider to insert their respective advertisements. It should be noted that the access provider advertisement time slot 32 is of the same duration across video channels, and the access provider is free to insert whatever advertisements are desired, and may insert any number of advertisements of any duration each into the time slot 32 for each video channel as long as the total duration does not exceed the duration of the time slot 32. This is the only part of the broadcast stream 12 that the access aggregation point 14 is legally allowed to modify, since the video content and the content provider advertisements are legally owned by the content provider.

The content provider advertisement time slot 36 may or may not be of the same duration across video channels. In addition, as can be seen from the example of FIG. 2, the individual content provider advertisements are not necessarily each of the same duration. These content provider advertisements are typically channel-specific, in that the content provider decides which advertisements to insert into which video channel based on the nature of the video content of the video channel.

The broadcast stream of FIG. 2 is an example only. More generally there may be any number of video channels within the broadcast stream 12. The broadcast stream 12 is continuous and there are typically numerous access provider advertisement time slots 32 over time and numerous content provider advertisement time slots 36 over time. A content provider advertisement time slot may even directly follow an access provider advertisement time slot, or vice versa, with no intervening video content. The location within the broadcast stream and the duration of the access provider advertisement time slots is typically negotiated between the content provider and the access provider.

Figure 3:
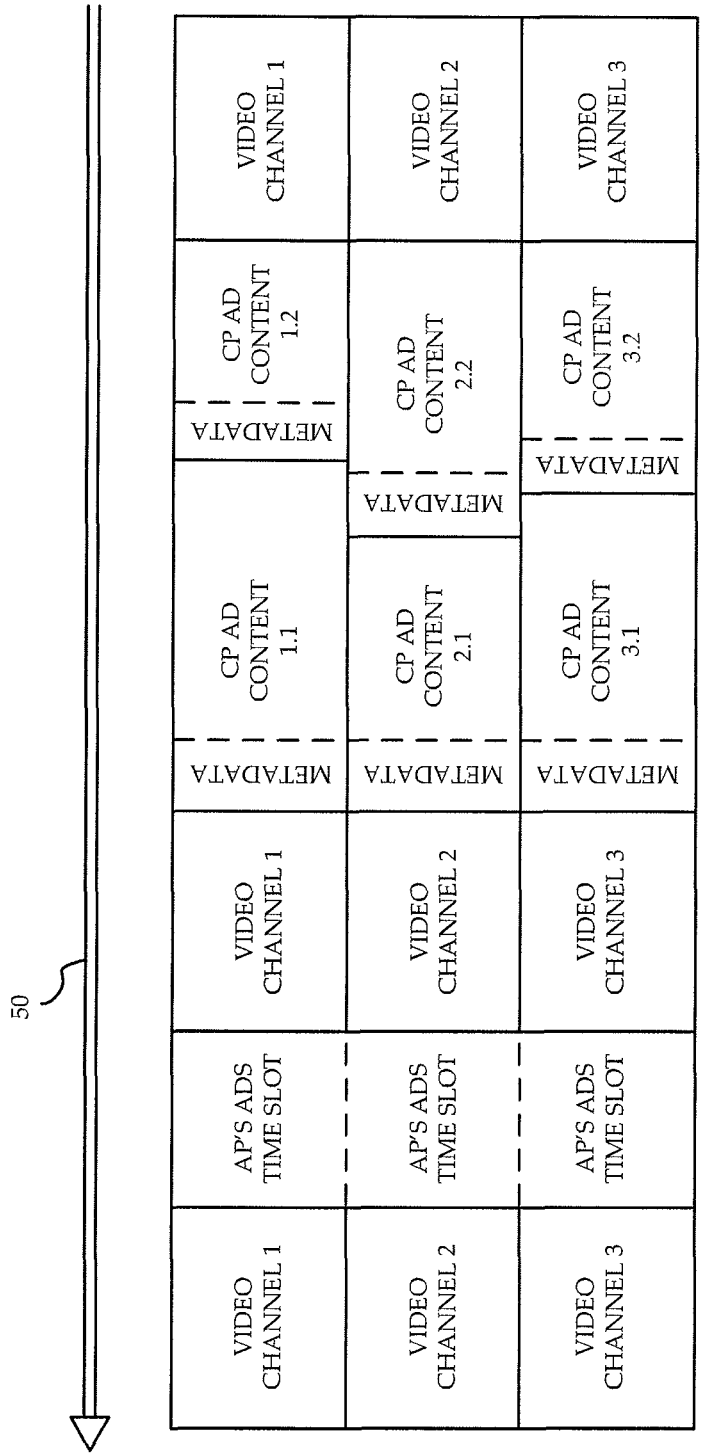
FIG. 3 is a diagram of the example broadcast stream of FIG. 2 into which metadata has been inserted according to one embodiment of the invention.

Referring to FIG. 3, a diagram of an example broadcast stream 50 into which metadata has been inserted according to one embodiment of the invention is shown. The metadata is associated with and prepended to each content provider advertisement. The metadata may be associated with the advertisement by any party having legal authority to manipulate the content provider advertisement portion of the broadcast stream and will typically be a party upstream of the access aggregation point. For example, the metadata may be inserted by the content provider at the same time as the content provider inserts the content provider advertisements. Alternatively, the metadata may be inserted within the content provider advertisements at the same time as the advertisements are created or provided to the content provider, such as by a creator of the advertisements. The metadata describes characteristics of the advertisement which may be relevant to determining whether to display the advertisement at an enterprise subscriber site. For example, the metadata may include information such as type of business to which the advertiser belongs, the product or service being advertised, and the advertiser's identity. This information helps to define whether the advertisement with which the metadata is associated is desirable for display to a predefined group of subscribers based on preset criteria.

Figure 4:
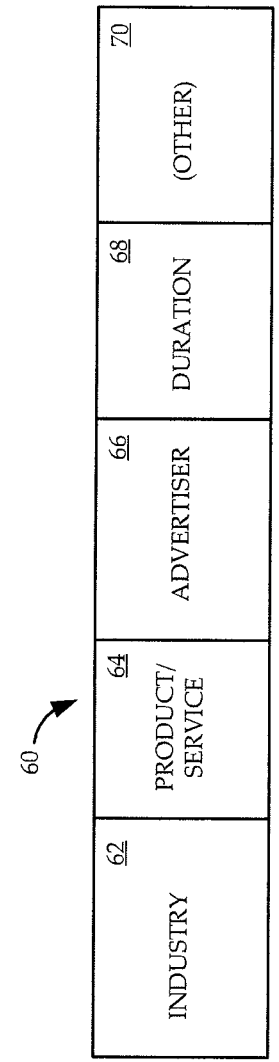
FIG. 4 is a diagram of metadata which is associated with and prepended to a content provider advertisement according to one embodiment of the invention.

Referring to FIG. 4, a diagram of the metadata which is associated with and prepended to a content provider advertisement according to one embodiment of the invention is shown. The metadata 60 includes an industry field 62, a product/service field 64, an advertiser identification field 66, and an advertisement duration 68. The fields may be of any appropriate length, for example 6 bits for the industry field 62, 8 bits for the product/service field 64, bits for the advertiser identification field 66, and 16 bits (8 bits for seconds and 8 bits for hundredths of seconds) for the advertisement duration field 68. The metadata 60 may also contain additional fields 70 which would assist the access aggregation point 14 in determining whether to suppress display of the associated advertisement to a particular subscriber. For optimization of the decision making by the access aggregation point (as described below), a reserved value of "0" for the first field may be used to indicate that the video content payload associated with the metadata is not an advertisement.

The metadata 60 is prepended to a content provider advertisement within one of the standard IPTV video payload encoding frames, such as the P-frame. The choice of encoding frame into which the metadata is inserted must be such that it will not interfere with existing communication protocols. Alternatively, existing communication protocols must be altered slightly so as to correctly identify and interpret such a frame as a standard place for video advertisement metadata, although most existing communication protocols would simply ignore the metadata. The video payload of the advertisement, including the metadata, is then inserted into a broadcast stream.

Broadly, the access aggregation point suppresses advertisements which are undesirable to the enterprise subscriber by comparing metadata associated with the advertisements with criteria provided by the enterprise subscriber. Suppression of the advertisement may be done by switching transmission to another video channel than the one carrying the advertisement being suppressed.

Figure 5:
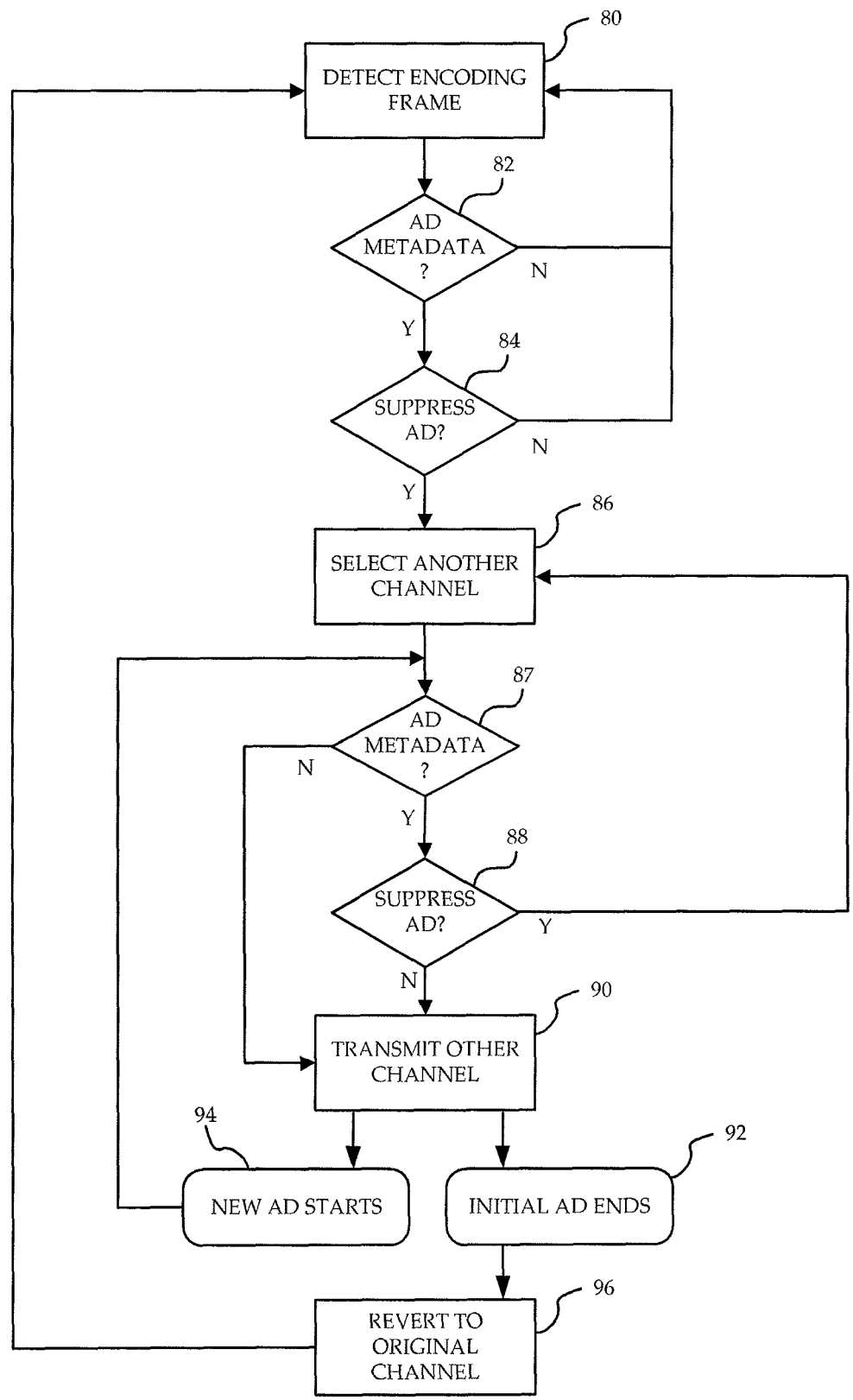
FIG. 5 is a flowchart of a method by which the access aggregation point of FIG. 1 controls display of content in a broadcast stream according to one embodiment of the invention.

Referring to FIG. 5, a flowchart of a method by which the access aggregation point of FIG. 1 controls display of content in a broadcast stream according to one embodiment of the invention is shown. For each video channel sent to an endpoint within the enterprise subscriber site, the access aggregation point 14 monitors the video channel for encoding frames in which advertisement metadata 60 may have been embedded. For example, the access aggregation point 14 may inspect P-frames within the video channel, although the specific type of frame inspected by the access aggregation point 14 will be implementation dependent and will depend on which frames the content provider (or other third party) populates with the metadata 60. At step 80 the access aggregation point detects an appropriate type of encoding frame. At step 82 the access aggregation point determines whether the encoding frame includes advertisement metadata. The presence of advertisement metadata may be indicated in any way, such as a non-zero value of the first field as described above with reference to FIG. 4. If the access aggregation point determines that the encoding frame does not contain advertisement metadata, then the access aggregation point returns to monitoring for encoding frames in which advertisement metadata may have been embedded at step 80.

If the access aggregation point determines at step 82 that the encoding frame includes advertisement metadata, then at step 84 the access aggregation point determines whether the advertisement associated with the metadata is to be suppressed. The access aggregation point determines this using suppression criteria provided by the enterprise subscriber site 20 to which the video channel is being sent and using the advertisement metadata 60. For example, the enterprise subscriber site 20 may have set the suppression criteria as "NO hotel industry AND NO alcohol ON Apr. 22, 2008". The access aggregation point determines whether the various fields within the metadata satisfy the "NO hotel industry" and the "NO alcohol" criteria, and whether the current date is Apr. 22, 2008. If the access aggregation point determines that the advertisement associated with the metadata within the encoding frame is not to be suppressed, then the access aggregation point simply allows transmission of the advertisement and returns to monitoring for encoding frames in which advertisement metadata may have been embedded at step 80.

If the access aggregation point determines at step 84 that the advertisement is to be suppressed, then at step 86 the access aggregation point selects a different video channel within the broadcast stream 50 for transmission to the endpoint from among the video content available to the enterprise subscriber site 20. The different video content may be selected in any of a number of ways, such as selecting a random channel from among all available channels, selecting the next channel in a sequential list of the channels, or selecting from a pre-defined efficient search tree.

As described above with reference to FIG. 2 and FIG. 3 all channels may carry content provider advertisements at the same time, although an advertisement may already be under way in a different channel (consider a determination to suppress content provider advertisement 1.2 in FIG. 3). Since the aim of the invention is to suppress display of advertisements which are undesirable by the enterprise subscriber, the access aggregation point should not simply suppress one undesirable advertisement by switching to display of another undesirable advertisement. At step 87 the access aggregation point determines whether the newly selected channel is currently displaying an advertisement. If so, the access aggregation point determines at step 88 whether the advertisement being carried by the newly selected channel is to be suppressed as well. The determination at step 88 is carried out by the access aggregation point in the same way as the determination at step 84, using the suppression criteria provided by the enterprise subscriber and the metadata associated with the advertisement. If the access aggregation point determines at step 88 that the advertisement of the newly selected channel is to be suppressed, then the access aggregation point selects yet another channel at step 86.

The access aggregation point will continue selecting channels until a channel is found that is either playing a content provider advertisement that is not to be suppressed, i.e. whose metadata indicates that it is acceptable under the suppression criteria provided by the enterprise subscriber, or that is not playing an advertisement. At step 90 the access aggregation point then transmits the channel playing the acceptable content to the endpoint. Transmission of this selected channel continues until either the initial advertisement in the original channel ends 92, as indicated by the metadata of the initial advertisement, or a new advertisement starts 94 in the selected channel. If the initial advertisement ends 92, the access aggregation point reverts to transmission of the original video channel at step 96 and returns to monitoring for encoding frames at step 80. If a new advertisement starts 94 in the selected channel, the access aggregation point determines at step 87 whether the selected channel includes advertisement metadata and if so, determines at step 88 whether to suppress the new advertisement. Based on this determination, the access aggregation point then either continues to transmit the selected channel at step 90 or selects yet another channel at step 86.

The method described above with reference to FIG. 5 may be at least partly implemented as a media policy enforcement (MPE) module within the access aggregation point. The MPE module is a complement to the existing multicast or unicast video processing mechanisms, such as an IGMP proxy, a PIM router, or other multicast/broadcast-like protocol engine. The MPE module is preferably implemented as logical instructions in the form of software. Alternatively, the logical instructions may be implemented as hardware, or as a combination of software or hardware. If in the form of software, the logical instructions may be stored on a computer-readable medium in a form executable by a computer processor.

Since the purpose of the invention is to suppress particular types of content provider advertisements which are undesirable to an enterprise subscriber, an end-user at an endpoint within the enterprise subscriber site should not be able to simply switch back to view the initial advertisement. Each time the access aggregation point receives a signal from an endpoint to switch to a new video channel, the access aggregation point determines whether an advertisement is playing on the new video channel, whether any such advertisement is to be suppressed in accordance with suppression criteria provided by the enterprise subscriber, and if so switches transmission of channels to another channel. In one embodiment, the end-user may override the suppression of advertisements. This may be done, for example, by providing an override function on the interface of the endpoint. As another example, this may be done by discontinuing the detection and suppression method for a certain length of time (such as 1 minute) after an end-user selects a new channel, which effectively means that the method of the invention will pause when an end-user switches back to the original channel.

The determination as to whether to suppress an advertisement has been described as determining whether the metadata matches suppression criteria provided by the enterprise subscriber. Of course the determination could be a negative test rather than a positive test, in that the enterprise subscriber provides acceptance criteria and the access aggregation point suppresses an advertisement if it does not satisfy the acceptance criteria. This embodiment would likely require much more processing power however, since the criteria for acceptance would typically be much broader than the criteria for suppression. Most generally, the access aggregation point makes a determination as to whether to suppress a particular advertisement based on a comparison of metadata associated with the advertisement with preset criteria provided by the enterprise subscriber, and determines that the advertisement is to be suppressed if the comparison indicates that the advertisement is undesirable to the enterprise subscriber.

The invention has been described as the access aggregation point suppressing display of advertisements to endpoints within an enterprise subscriber site if the advertisements match criteria provided by the enterprise subscriber site. The invention could also prove advantageous for individual endpoints which are not within an enterprise subscriber site. For example, parents concerned about what their children are watching on television at home may decide to have alcohol-related advertisements or "racy" advertisements suppressed, and may be willing to pay their access aggregation point for such a service. In such an embodiment, the criteria are provided by the individual end-user or may be selected by the individual end-user from a set of criteria defined by the access aggregation point. The criteria are enforced by the access aggregation point, and no changes in the individual end-user's behaviour are required.

The invention has been described as the access aggregation point continuously searching for acceptable video content (steps 86, 87, 88 of FIG. 5) in the event that an undesirable content provider advertisement is detected in the original channel. In one embodiment, a limit to the number of consecutive checks or the search time may be set in accordance with video QoS considerations. In such a case, if acceptable alternative content cannot be found with the set time limit or set maximum number of attempts, the access aggregation point may simply revert transmission to the original channel.

The invention has been described as the access aggregation point switching transmission to a different video channel when an advertisement in the original video channel is to be suppressed. Alternatively, the access aggregation point may instead switch transmission to a neutral "test pattern" or channel, thereby removing the need to locate a second channel which is playing an acceptable advertisement. In such an embodiment, the steps 86, 87, and 88 described above with reference to FIG. 5 would be omitted, and the step 90 replaced with simply transmitting a neutral channel for the duration of the initial advertisement until the initial advertisement ends at step 92. The neutral channel could alternatively be a stream carrying content provided by the access aggregation point or by the enterprise subscriber, such as advertisements for the hotel chain of the enterprise subscriber, or may even be a multicast address for which no "content" is broadcast and would result in a black screen for the duration of the suppressed advertisement. Such an embodiment may also be combined with the embodiment in which there is a maximum number of attempts or a maximum time limit for locating alternative video content. In other words, if the access aggregation point fails to locate acceptable video content within a maximum number of attempts or a maximum time limit, the access aggregation point switches transmission to the neutral channel.

The embodiments presented are exemplary only and persons skilled in the art would appreciate that variations to the embodiments described above may be made without departing from the spirit of the invention. The scope of the invention is solely defined by the appended claims.

We claim:

1. A method of controlling display of advertisements within a video over internet protocol (IP) stream originating at a content provider, comprising:
   at an access aggregation point, receiving a first video channel of the stream;
   at the access aggregation point, transmitting the first video channel of the stream to an endpoint;
   upon detection by the access aggregation point of metadata indicating an advertisement within the first video channel, comparing the metadata with preset criteria; and
   if the comparison indicates that the advertisement is undesirable, the access aggregation point suppressing display of the advertisement by switching transmission to a second video channel.

2. The method of claim 1 wherein the endpoint is within an enterprise subscriber site, and the preset criteria are provided by an enterprise subscriber operating the enterprise subscriber site.

3. The method of claim 1 wherein the endpoint is an individual endpoint, and the preset criteria is provided by an end-user of the individual endpoint.

4. The method of claim 1 wherein the advertisement is provided by the content provider.

5. The method of claim 1 wherein the second video channel is a channel within the stream.

6. The method of claim 5 further comprising:
   upon detection by the access aggregation point of second metadata indicating an advertisement within the second video channel, comparing the second metadata with the preset criteria; and
   if the comparison of the second metadata with the preset criteria indicates that the advertisement within the second video channel is undesirable, the access aggregation point suppressing display of the advertisement by switching transmission to a third video channel.

7. The method of claim 1 wherein the second video channel is provided by the access aggregation point.

8. The method of claim 2 wherein the second video channel is provided by the enterprise subscriber.

9. The method of claim 6 further comprising repeatedly determining whether selected video channels are carrying an advertisement with metadata indicating that the advertisement is undesirable by comparison with the preset criteria until either a video channel is found which is not carrying an advertisement which is undesirable or a predefined maximum number of video channels have been examined for content acceptable under the preset criteria.

10. The method of claim 9 further comprising:
    if the predefined maximum number of video channels have been examined, switching transmission to content from outside the stream.

11. The method of claim 6 further comprising repeatedly determining whether selected video channels are carrying an advertisement with metadata indicating that the advertisement is undesirable by comparison with the preset criteria until either a video channel is found which is not carrying an advertisement which is undesirable or a time limit expires.

12. The method of claim 11 further comprising:
    if the time limit expires, switching transmission to content from outside the stream.

13. The method of claim 1 further comprising:
    upon termination of the advertisement within the first video channel, reverting to transmission of the first video channel.

14. The method of claim 1 wherein the metadata includes a field identifying a product or service to which the advertisement relates, a field identifying an industry or type of business to which the advertisement relates, and a field identifying an advertiser to which the advertisement relates, and wherein the preset criteria include at least one of an undesirable product or service, an undesirable industry or type of business, and an identity of an advertiser.

15. An access aggregation point comprising:
   means for receiving a video over internet protocol (IP) stream from a content provider;
   means for transmitting a first video channel of the stream to an endpoint; and
   a Media Policy Enforcement (MPE) module including:
   means for detecting metadata within the first video channel indicating an advertisement within the first video channel;
   means for comparing the metadata with preset criteria; and
   means for suppressing display of the advertisement by causing transmission to be switched to a second video channel if the comparison indicates that the advertisement is undesirable.

16. The access aggregation point of claim 15 wherein the access aggregation point is a DSLAM or an access router.

17. The access aggregation point of claim 15 wherein the second video channel is a channel within the stream.

18. The access aggregation point of claim 15 further comprising means for reverting to transmission of the first video channel upon termination of the advertisement within the first video channel.

19. A method of transmitting advertisements within a video over internet protocol (IP) stream, comprising:
   associating metadata with an advertisement;
   inserting the metadata within an encoding frame of a payload of the advertisement;
   transmitting the payload of the advertisement within the video over IP stream; and the metadata includes a field identifying a product or service to which the advertisement relates, a field identifying an industry or type of business to which the advertisement relates, a field identifying an advertiser to which the advertisement relates, and a field indicating a duration of the advertisement.

* * * * *